United States Patent
Lee et al.

(10) Patent No.: US 10,394,075 B2
(45) Date of Patent: Aug. 27, 2019

(54) TRANSPARENT DISPLAY DEVICE

(71) Applicant: Coretronic Corporation, Hsin-Chu (TW)

(72) Inventors: Hsin-Hung Lee, Hsin-Chu (TW); Yi-Yu Tsai, Hsin-Chu (TW); Chiao-Chih Yang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/675,500

(22) Filed: Aug. 11, 2017

(65) Prior Publication Data

US 2018/0101053 A1 Apr. 12, 2018

(30) Foreign Application Priority Data

Oct. 11, 2016 (TW) .............. 105215418 U (51) Int. Cl.
*G02F 1/1335* (2006.01)
*G02F 1/01* (2006.01)
*G02F 1/13* (2006.01)

(52) U.S. Cl.
CPC ...... *G02F 1/133524* (2013.01); *G02F 1/0105* (2013.01); *G02F 1/1306* (2013.01); *G02F 1/133603* (2013.01); *G02F 1/133615* (2013.01)

(58) Field of Classification Search
CPC ............. G02F 1/133524; G02F 1/0105; G02F 1/1306; G02F 1/133603; G02F 1/133615; G02F 2001/133342; G02F 1/133602
See application file for complete search history.

(56) References Cited

U.S. PATENT DOCUMENTS

| | | | |
|---|---|---|---|
| 2,607,145 A | 8/1952 | Pope | |
| 4,453,200 A | 6/1984 | Trcka et al. | |
| 5,040,878 A | 8/1991 | Eichenlaub | |
| 5,265,357 A | 11/1993 | Yu | |
| 5,594,830 A * | 1/1997 | Winston | F21V 5/02 385/129 |
| 6,628,352 B1 | 9/2003 | Sumida et al. | |
| 6,879,354 B1 | 4/2005 | Sawayama et al. | |
| 7,001,060 B1 | 2/2006 | Kimura | |
| 8,920,018 B2 | 12/2014 | Huang | |

(Continued)

FOREIGN PATENT DOCUMENTS

| CN | 201021964 Y | 2/2008 |
|---|---|---|
| CN | 103943033 A | 7/2014 |

(Continued)

*Primary Examiner* — Nathanael R Briggs (57) ABSTRACT

A transparent display device includes a transmissive light valve panel, a transparent plate and at least one light emitting assembly. The transmissive light valve panel has a display surface. The transparent plate is disposed with respect to the transmissive light valve panel to form an optical space between the transparent plate and the transmissive light valve panel. The at least one light emitting assembly is disposed beside the optical space and adapted to generate light into the optical space. A light pattern of the light emitted from the light emitting assembly and directed to the optical space has at least one maximum peak in an angular range of ±15° with respect to a direction parallel to the display surface of the transmissive light valve panel.

17 Claims, 12 Drawing Sheets

(56) References Cited

U.S. PATENT DOCUMENTS

| | | | |
|---|---|---|---|
| 2001/0022636 A1* | 9/2001 | Yang | G02B 6/003 349/65 |
| 2002/0085131 A1 | 7/2002 | Sladen | |
| 2003/0016930 A1 | 1/2003 | Inditsky | |
| 2003/0020850 A1 | 1/2003 | Funamoto et al. | |
| 2004/0189891 A1 | 9/2004 | Hayashimoto et al. | |
| 2008/0013013 A1* | 1/2008 | Kim | G02B 6/0038 349/63 |
| 2008/0128714 A1 | 6/2008 | Pang et al. | |
| 2009/0196069 A1* | 8/2009 | Iwasaki | G02B 6/0041 362/613 |
| 2013/0058126 A1 | 3/2013 | Kim et al. | |
| 2013/0201719 A1* | 8/2013 | Kuo | G02B 6/0028 362/603 |
| 2014/0300845 A1 | 10/2014 | Tamaki et al. | |
| 2015/0036335 A1* | 2/2015 | Liu | F21V 7/09 362/235 |
| 2017/0307803 A1 | 10/2017 | Lee et al. | |

FOREIGN PATENT DOCUMENTS

| | | |
|---|---|---|
| CN | 103412434 B | 3/2016 |
| TW | I238372 B | 8/2005 |
| TW | 201303439 A1 | 1/2013 |

\* cited by examiner

TRANSPARENT DISPLAY DEVICE

CROSS-REFERENCE TO RELATED APPLICATION

This application claims the priority benefit of TW105215418 filed on 2016 Oct. 11. The entirety of the above-mentioned patent application is hereby incorporated by reference herein and made a part of this specification.

FIELD OF THE INVENTION

The invention relates to a transparent display device, and more particularly to a transparent display device in which a light emitted from a light emitting assembly is incident on in optical space between a transparent plate and a transmissive light valve panel at a large angle and reflected by the transparent plate and then passes through the transmissive light valve panel to produce images.

BACKGROUND OF THE INVENTION

Conventional transparent display technology is substantially the same as the general display technology. In the case of a liquid crystal display panel, it is not necessary to dispose with an optical film when applying to the transparent display technology, but microstructures are still required to be formed on a light guide plate to have a homogenized backlight. The microstructures can be printed dots, but the distribution of microstructures cannot be too dense, otherwise the clarity of the objects behind the transparent display device will be affected. In addition, the size of microstructures cannot be too large, which represents a more difficult process for large areas due to microstructure in a large area configuration is not easy to control, and consequently the manufacturing yield may decline and the manufacturing cost may increase.

In the transparent display device, because the optical film cannot be disposed between the light guide plate and the display panel to atomize the light, the microstructure may generate an interference pattern with the thin film transistor (TFT) array. Although the aforementioned issue can be avoided by changing the periodic arrangement of the microstructures in space, but the design of the degree of freedom will be reduced and also the interference pattern cannot be completely eliminated.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

Therefore, one objective of the invention is to provide a transparent display device, in which a transparent plate and a transmissive light valve panel are disposed opposite to each other, the light emitted from a light emitting assembly is incident in an optical space between the transparent plate and the transmissive light valve panel at a large angle, the light is transmitted between the transparent plate and the transmissive light valve panel, a small portion of the light directly passes through the transmissive light valve panel, and the major portion of the light is reflected by the transparent plate and then passes through the transmissive light valve panel; thus, the light passing through the transmissive light valve panel is similar to the light emitted from an uniform surface light source.

Other objectives and advantages of the invention can be further illustrated by the technical features broadly embodied and described as follows.

In order to achieve one or a portion of or all of the objects or other objects, the invention provides a transparent display device, which includes a transmissive light valve panel, a transparent plate and at least one light emitting assembly. The transmissive light valve panel has a display surface. The transparent plate is disposed with respect to the transmissive light valve panel to form an optical space between the transparent plate and the transmissive light valve panel. The at least one light emitting assembly is disposed beside the optical space and adapted to generate light into the optical space. A light pattern of the light emitted from the light emitting assembly and directed to the optical space has at least one maximum peak in an angular range of ±15° with respect to a direction parallel to the display surface of the transmissive light valve panel.

The invention provide a transparent display device, in which the light emitted from the light emitting assembly enters into the optical space, a portion of the light directly passes through the transmissive light valve panel, and the major portion of the light is reflected by the transparent plate and then passes through the transmissive light valve panel to generate an image. Because the transparent plate is not disposed with microstructures such as dots, the object behind the transparent display device can be clearly seen. Further, because the transparent plate is not disposed with microstructures, the production process of the transparent plate can be simplified, the cost is reduced and the yield is improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
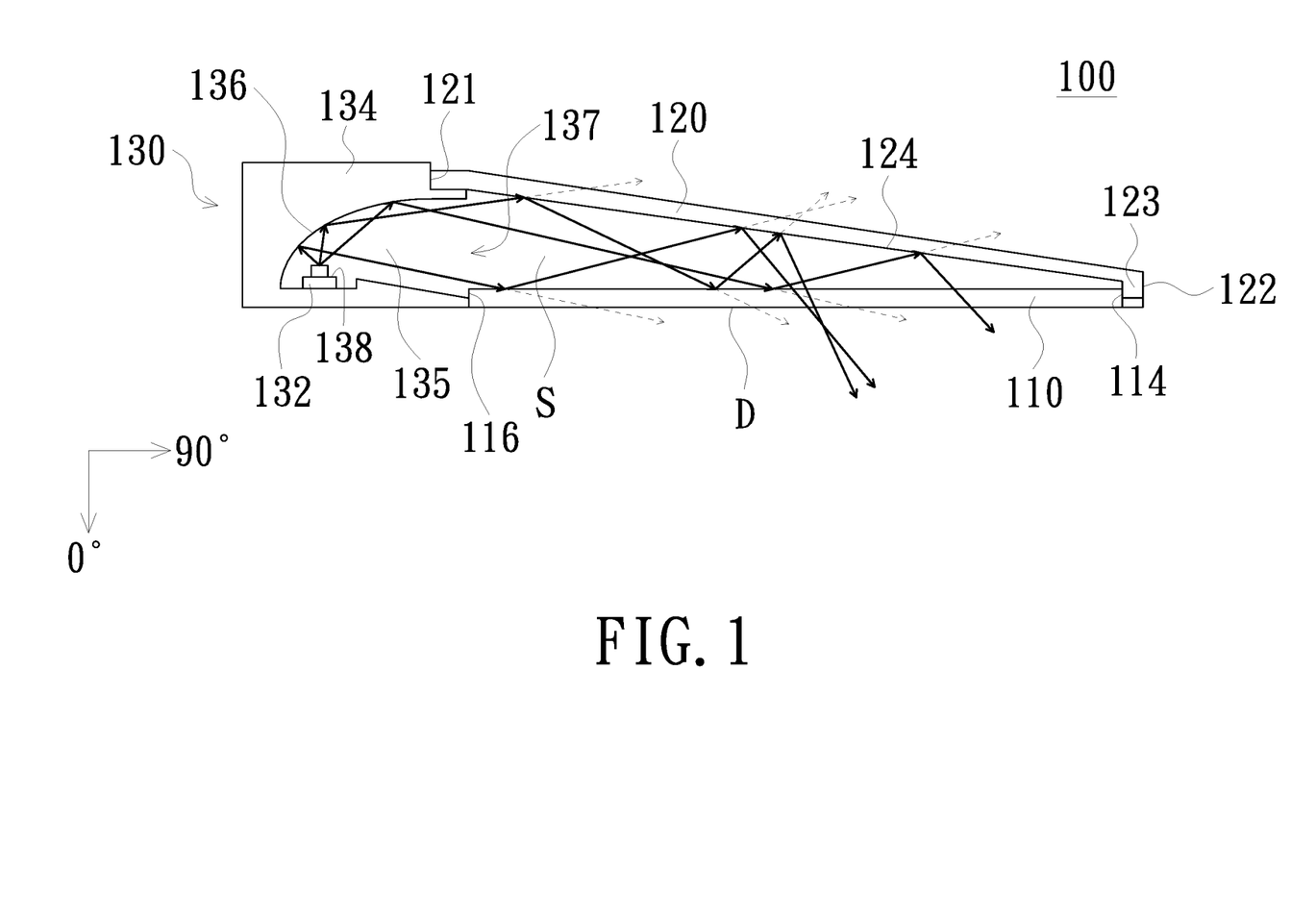
FIG. 1 is a schematic view of a transparent display device in accordance with the first embodiment of the invention.

Please refer to FIG. 1, which is a schematic view of a transparent display device in accordance with the first embodiment of the invention. The transparent display device 100 of the embodiment includes a transmissive light valve panel 110, a transparent plate 120 and a light emitting assembly 130. The transmissive light valve panel 110 has a display surface D. In the embodiment, the direction perpendicular to the display surface D of the transmissive light valve panel 110 is defined as 0 degrees, and the direction parallel to the display surface D of the transmissive light valve panel 110 is defined as 90 degrees. The transparent plate 120 is disposed with respect to the transmissive light valve panel 110 so as to form an optical space S between the transparent plate 120 and the transmissive light valve panel 110. The light emitting assembly 130 is disposed beside the optical space S and is adapted to generate light into the optical Space S. The light pattern of the light emitted from the light emitting assembly 130 and directed to the optical space S has at least one maximum peak in an angular range of ±15° with respect to the direction parallel to the display surface D of the transmissive light valve panel 110.

Figure 2:
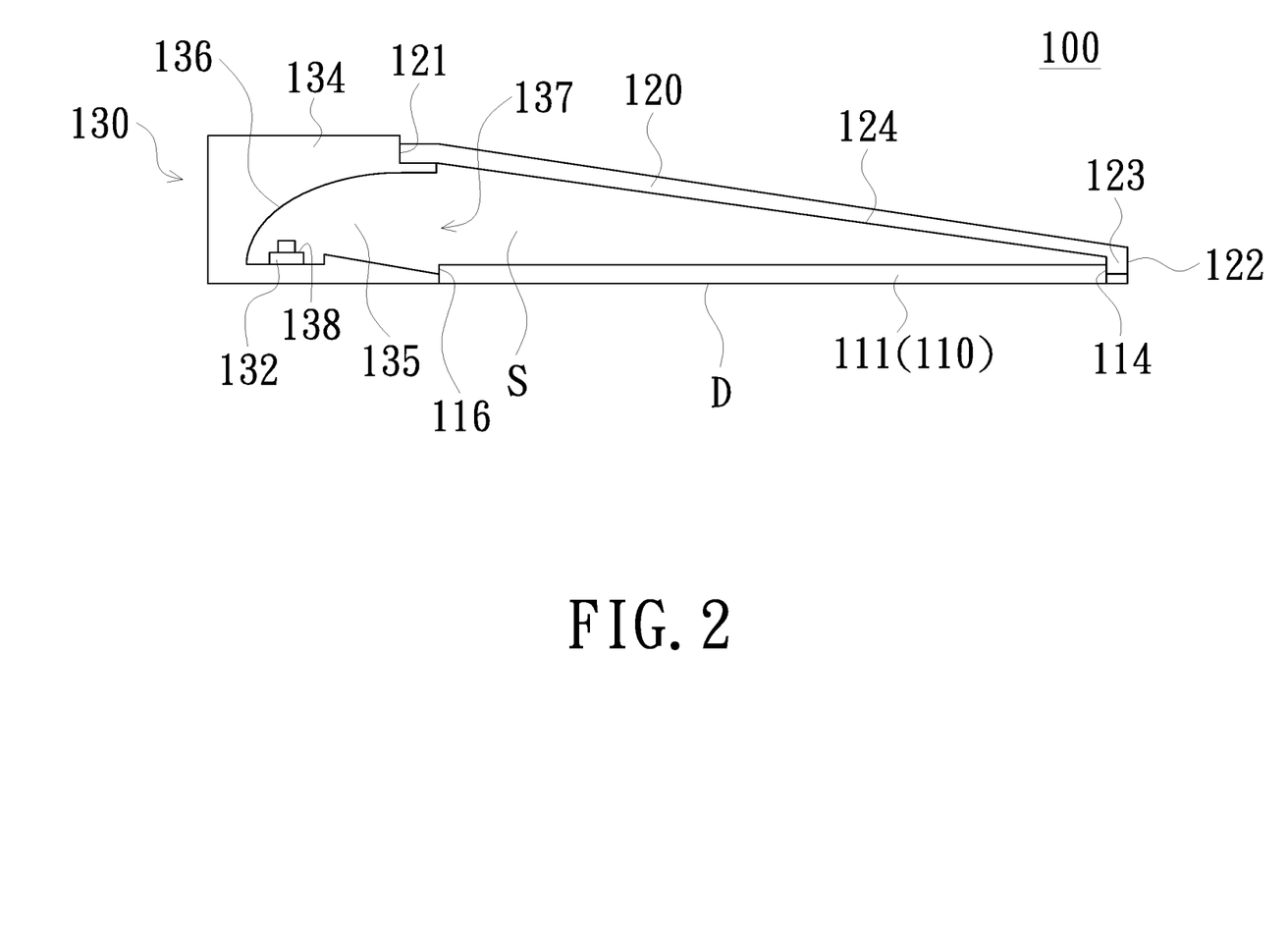
FIG. 2 is a schematic view of an example of the transparent display device shown in FIG. 1.

In the embodiment, the transparent plate 120 has a first end 121 and a second end 122 opposite to each other. The transparent plate 120 is disposed inclinedly with respect to the transmissive light valve panel 110, and the distance between the first end 121 of the transparent plate 120 and the transmissive light valve panel 110 is greater than the distance between the second end 122 of the transparent plate 120 and the transmissive light valve panel 110. The light emitting assembly 130 is adjacent to the first end 121 of the transparent plate 120. In the embodiment, the transparent plate 120 is inclined at an angle of, for example, less than 15 degrees with respect to the transmissive light valve panel 110, and the second end 122 of the transparent plate 120 is connected to the transmissive light valve panel 110. As shown in FIG. 1, the second end 122 of the transparent plate 120 has a short wall 123; the short wall 123 abuts an end portion 114 of the transmissive light valve panel 110; the transparent plate 120 is inclined with respect to the transmissive light valve panel 110; and the angle between the transparent plate 120 and the transmissive light valve panel 110 is less than 15 degrees. The first end 121 of the transparent plate 120 and the other end portion 116 of the transmissive light valve panel 110 are connected to the light emitting assembly 130. In the embodiment, the refractive index of the transparent plate 120 may be about 1.4, but the invention is not limited thereto. The transparent plate 120 may be made of polymethylmethacrylate (PMMA) or polycarbonate (PC) material. The thickness of the transparent plate 120 may be, for example, 0.5 mm to 2 mm, depending on the design requirements; however, the transparent plate 120 should not be too thick to avoid photo-lamination. In the embodiment, the transmissive light valve panel 110 may be a liquid crystal display panel 111 (shown in FIG. 2), a polymer dispersed liquid crystal (PDLC) display panel 112 (shown in FIG. 3), or has a stacked structure combined with the liquid crystal display panel 111 and the polymer dispersed liquid crystal display panel 112 (shown in FIG. 4).

Figure 3:
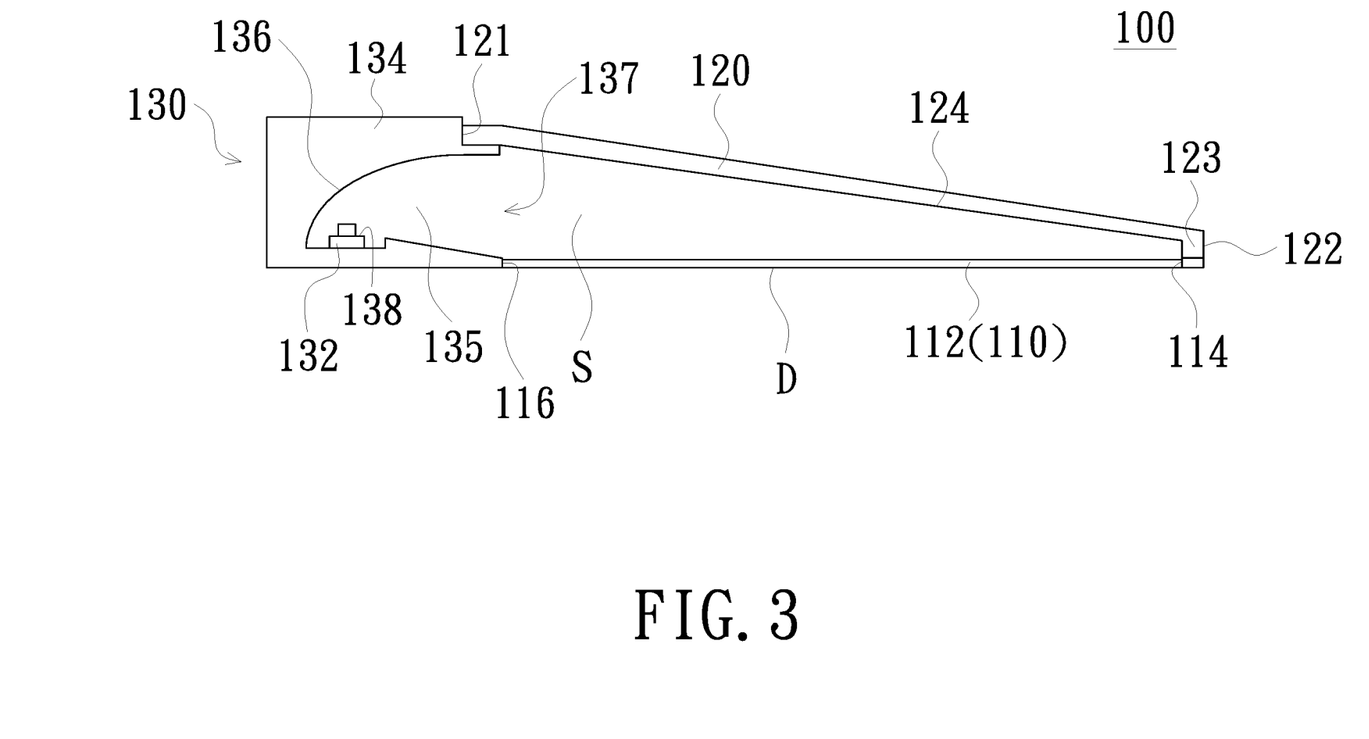
FIG. 3 is a schematic view of another example of the transparent display device shown in FIG. 1.
Figure 4:
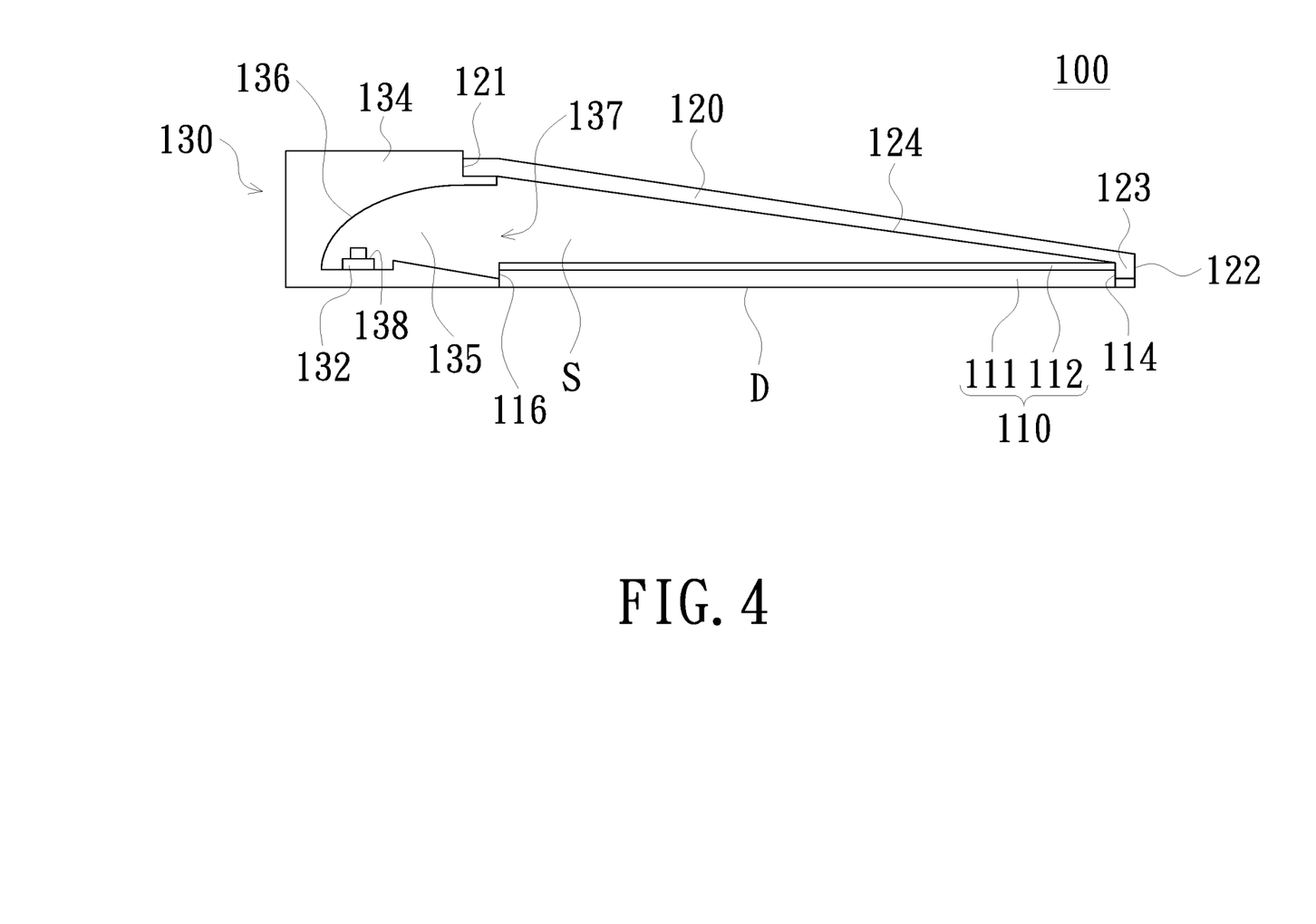
FIG. 4 is a schematic view of still another example of the transparent display device shown in FIG. 1.
Figure 5:
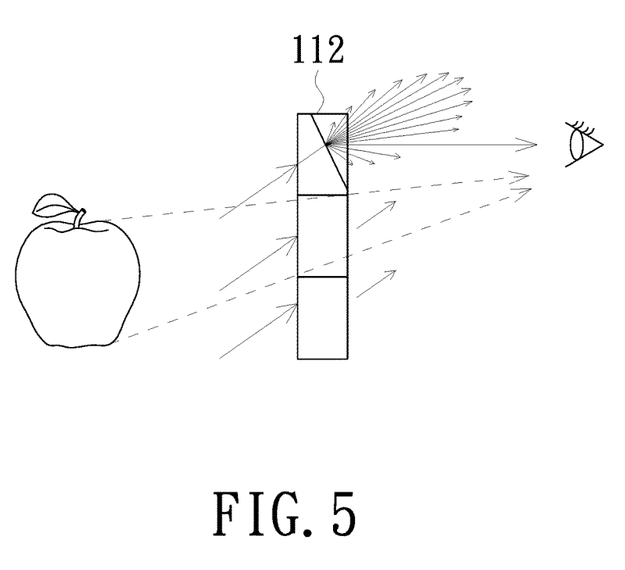
FIG. 5 is a schematic illustration of a large-angle emergent light produced by the polymer dispersed liquid crystal display panel of FIG. 3 with the light emitting assembly and the transparent plate of the invention.

FIG. 5 is a schematic illustration of a large-angle emergent light produced by the polymer dispersed liquid crystal display panel 112 of FIG. 3 with the light emitting assembly 130 and the transparent plate 120 of the invention. The polymer dispersed liquid crystal display panel 112 is adapted to allow light to pass through or scatter light to produce atomization based on power on or not. Because only one polymer dispersed liquid crystal display panel 112 is used and it has a working principle for light scattering, the switch between the bright state and the dark state cannot be provided. However, with the backlight structure of the invention, the emergent light can have a large angle with respect to the normal direction of the display panel. Further, by configuring the polymer dispersed liquid crystal display panel 112 to switch the degree of atomization of the emergent light of the backlight module, the light can be diffused to the normal direction with different degrees so as to achieve the gray-scale control effect of the bright and dark states and let the viewer in front of the polymer dispersed liquid crystal display panel 112 easy to see the image desired to be displayed. In addition, as shown in FIG. 4, by the stacked structure combined with the liquid crystal display panel 111 and the polymer dispersed liquid crystal display panel 112, the light can be controlled to pass through or to be atomized as well as the object behind the transparent display device 100 can be controlled to be visible or disappeared.

Figure 6:
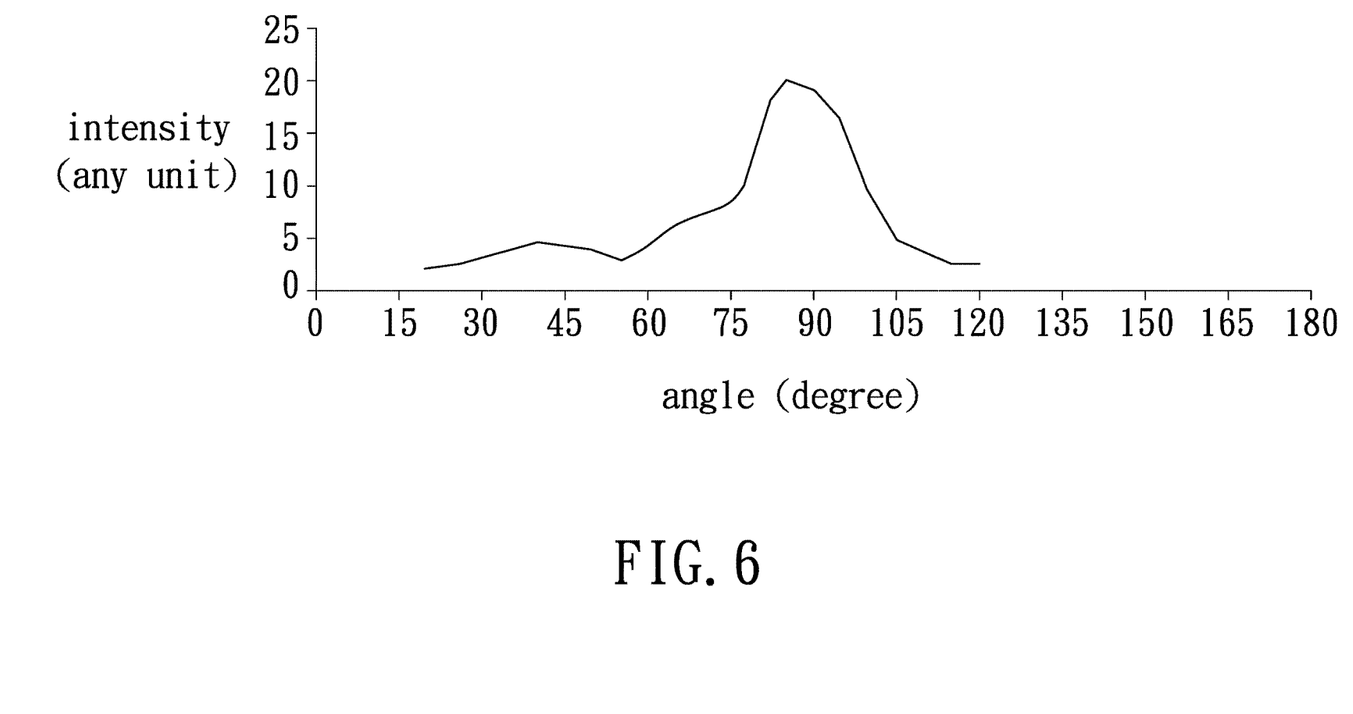
FIG. 6 is a schematic view of the light pattern produced by the light emitting assembly in accordance with the first embodiment of FIG. 1.
Figure 7:
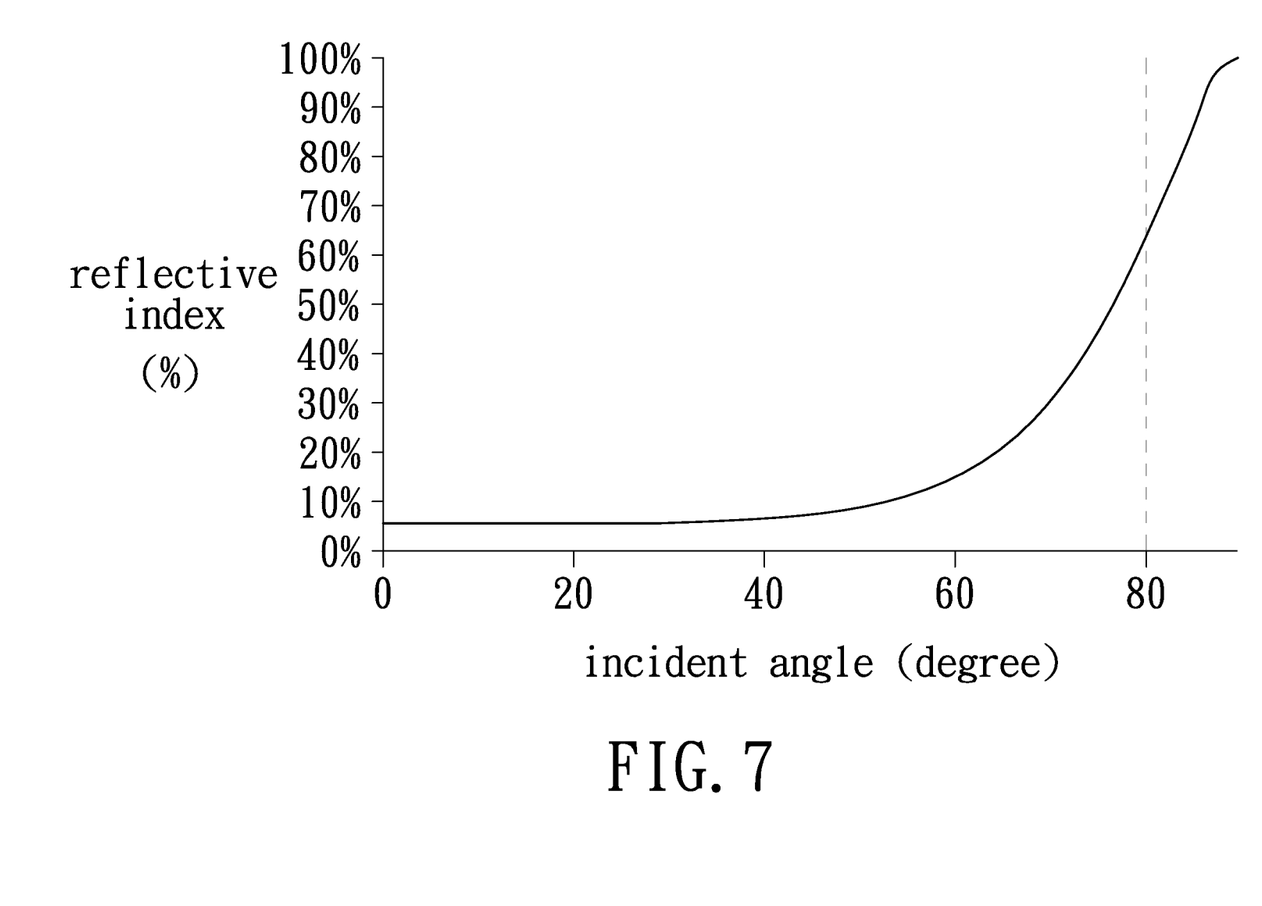
FIG. 7 is a schematic view of the curves of the angle of the light of the light emitting assembly of the transparent display device shown in FIG. 1 incident the transparent panel and the reflective index.

Please refer to FIG. 1 again. The light emitting assembly 130 includes a light source 132 and a lampshade 134. The lampshade 134 has an accommodating space 135 and an opening end 137. The light source 132 is disposed in the accommodating space 135, and the opening end 137 faces the optical space S. As described above, the first end 121 of the transparent plate 120 and the end portion 116 of the transmissive light valve panel 110 are respectively connected to the two sides of the opening end 137 of the light emitting assembly 130, so that the accommodating space 135 is in communication with the optical space S. In the embodiment, the accommodating space 135 has a reflective curved surface 136; the light source 132 has a light exit surface 138 facing the reflective curved surface 136 and parallel to the display surface D of the transmissive light valve panel 110; and the reflective curved surface 136 extends from a side of the light source 132 in a direction toward the optical space S. In the embodiment, the other end of the reflective curved surface 136 is connected to the first end 121 of the transparent plate 120. The reflective curved surface 136 may be an arc surface, a parabolic surface or an elliptical surface, and the invention is not limited thereto as long as the reflective curved surface 136 is capable of reflecting the light emitted from the light source 132 into the optical space S and entering the transparent plate 120 at a large angle. In the embodiment, the reflective curved surface 136 results the light emitted from the light source 132 to have a light pattern, and the light pattern has a maximum peak in an angular range of ±15° with respect to the direction parallel to the display surface D of the transmissive light valve panel 110. In FIG. 6, the direction perpendicular to the display surface D of the transmissive light valve panel 110 is defined as 0 degrees, and the direction parallel to the display surface D of the transmissive light valve panel 110 is defined as 90 degrees. As shown in FIG. 6, the aforementioned light pattern has a maximum peak in an angular range of 75 to 105 degrees with respect to the direction parallel to the display surface D of the transmissive light valve panel 110. More specifically, the aforementioned light pattern has a maximum peak at about 90 degrees with respect to the direction parallel to the display surface D of the transmissive light valve panel 110. In addition, as shown in FIG. 7, the light emitted from the light source 132 and reflected by the reflective curved surface 136 to have the aforementioned light pattern is incident on the transparent plate 120 at an incident angle larger than 80 degrees; thus, a light contribution of up to 65% or more is obtained, and the light can return to one side of the transmissive light valve panel 110 to achieve the display effect. The method of manufacturing the lampshade 134 may use an injected plastic member to produce the curvature of the reflective curved surface 136 and form a reflective layer on the reflective curved surface 136. The reflective layer may be formed by metal plating or metal coating such as silver plating or chrome plating. In view of the heat dissipation of the light source 132, the lampshade 134 may be made of aluminum or other metallic material having better heat dissipation effect.

The light source 132 may include a plurality of light emitting elements, such as a light strip having a plurality of light emitting diodes. In another embodiment, the light source 132 may be a cold cathode fluorescent tube. The light emitting diode may be a Lambertan light emitting diode that cooperates with the reflective curved surface 136 to allow light to enter the optical space S and travel in a direction at a large angle to the transparent plate 120. In the embodiment, because the light exit surface 138 of the light source 132 faces the reflective curved surface 136, only a small portion of the light emitted from the light source 132 directly enters into the optical space S, and the major portion of the light is reflected by the reflective curved surface 136 and then enters into the optical space S. In the embodiment, the reflective curved surface 136 of the lightshade 134 directs 50% or more of the light emitted from the light source 132 in an angular range of ±15° with respect to the direction parallel to the display surface D of the transmissive light valve panel 110. A portion of the light entering the optical space S directly passes through the transmissive light valve panel 110 and the other portion is reflected by the transparent plate 120 and then passes through the transmissive light valve panel 110, so that the viewer can see the image. As described above, the light emitted from the light source 132 is incident on the transparent plate 120 at an incident angle larger than 80 degrees, a light contribution of up to 65% or more is obtained, and the light can return to one side of the transmissive light valve panel 110 to achieve the display effect; therefore, only a small portion of the light incident on the transparent plate 120 is refracted by the transparent plate 120 to the behind of the transparent plate 120, and the major portion of the light is reflected by a flat surface 124 of the transparent plate 120. In the embodiment, the flat surface 124 is in a smooth shape and disposed toward the transmissive light valve panel 110.

Figure 8:
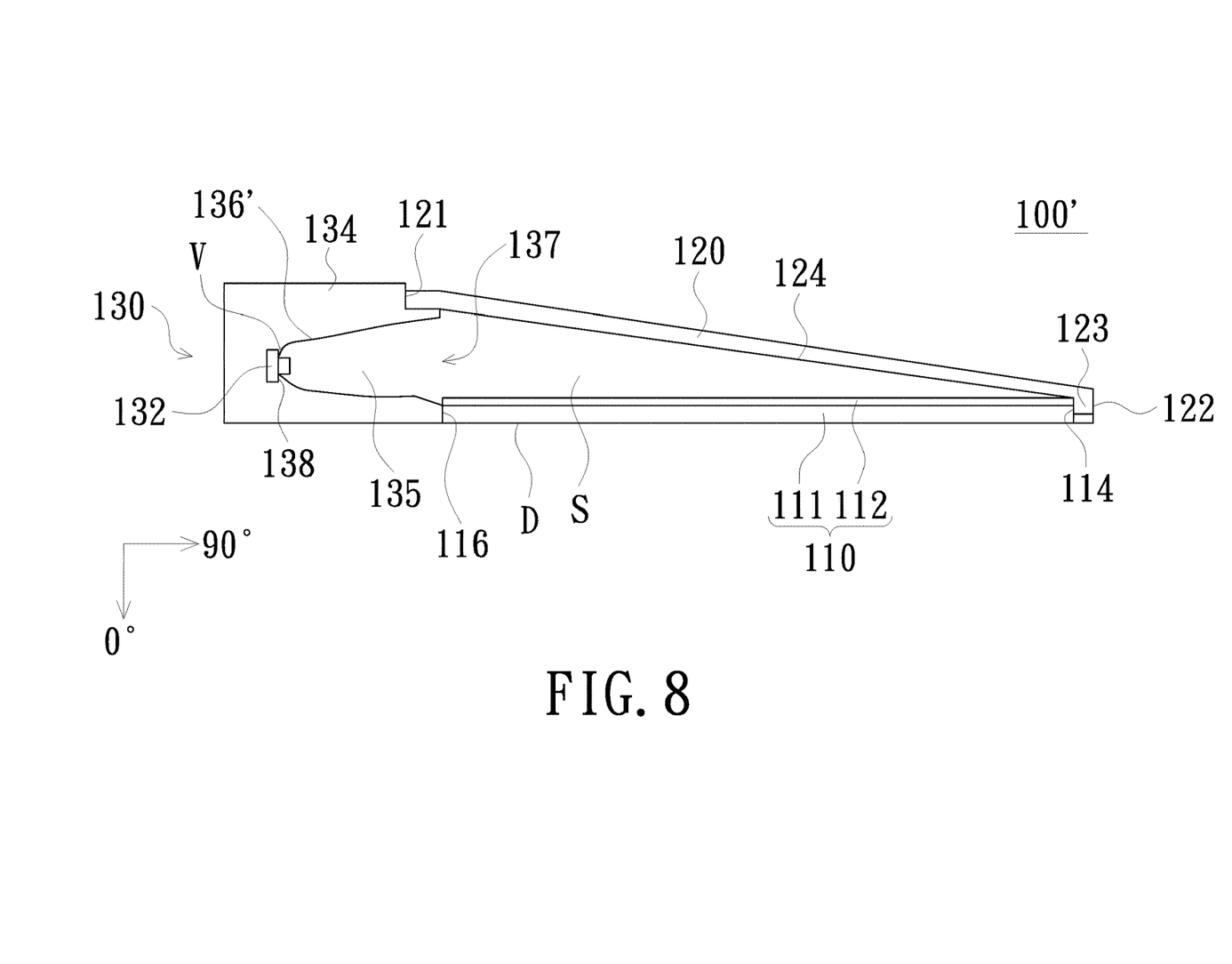
FIG. 8 is a schematic view of a transparent display device in accordance with the second embodiment of the invention.
Figure 9:
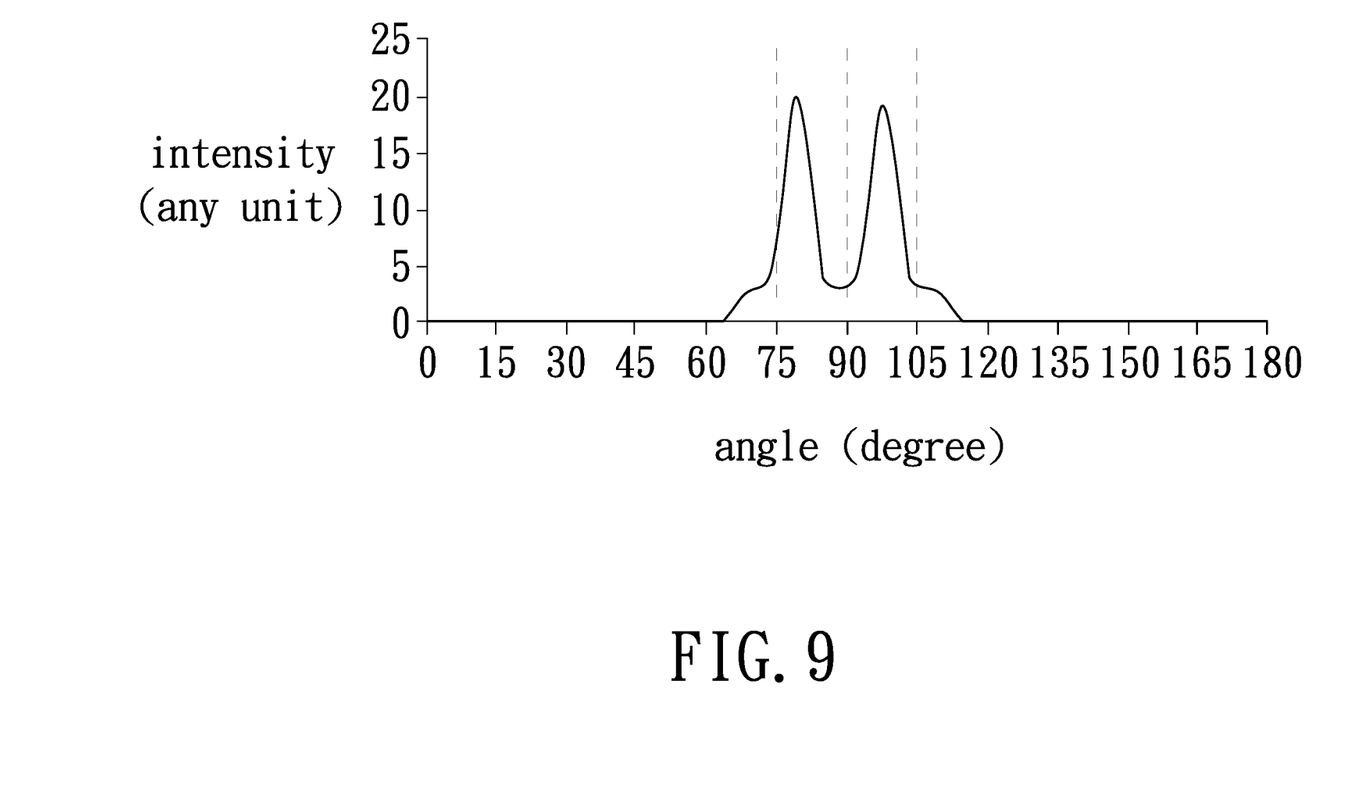
FIG. 9 is a schematic view of the light pattern produced by the light emitting assembly in accordance with the second embodiment of FIG. 7.

Please refer to FIG. 8, which is a schematic view of a transparent display device in accordance with the second embodiment of the invention. The configuration of the transparent display device 100' of the embodiment is substantially the same as that of the first embodiment shown in FIG. 1, and the same elements are given the same reference numerals and the description thereof is omitted. The embodiment differs from the first embodiment in that the reflective curved surface 136' of the lampshade 134 of the embodiment is different from the reflective curved surface 136 of the first embodiment. Specifically, the reflective curved surface 136' of the embodiment is disposed toward the optical space S and has an apex V. The light source 132 is disposed at the vertex V of the reflective curved surface 136'. The light exit surface 138 of the light source 132 faces the optical space S. The reflective curved surface 136' results the light emitted from the light source 132 to have a light pattern, and the light pattern has a maximum peak in an angular range of ±15° with respect to the direction parallel to the display surface D of the transmissive light valve panel 110, respectively. In FIG. 9, the direction perpendicular to the display surface D of the transmissive light valve panel 110 is defined as 0 degrees, and the direction parallel to the display surface D of the transmissive light valve panel 110 is defined as 90 degrees. As shown in FIG. 9, the aforementioned light pattern has a maximum peak in an angular range of 75 to 90 degrees with respect to the direction parallel to the display surface D of the transmissive light valve panel 110 and has another maximum peak in an angular range of 90 to 105 degrees with respect to the direction parallel to the display surface D of the transmissive light valve panel 110. More specifically, in the embodiment, the aforementioned light pattern has a maximum peak at about 80 and 100 degrees with respect to the direction parallel to the display surface D of the transmissive light valve panel 110, respectively. Similarly, in the embodiment, the transmissive light valve panel 110 is exemplified by a stacked structure combined with a liquid crystal display panel and a polymer dispersed liquid crystal display panel, but the invention is not limited thereto; that is, the transmissive light valve panel 110 may be, for example, a liquid crystal display panel or a polymer-dispersed liquid crystal display panel.

Figure 10:
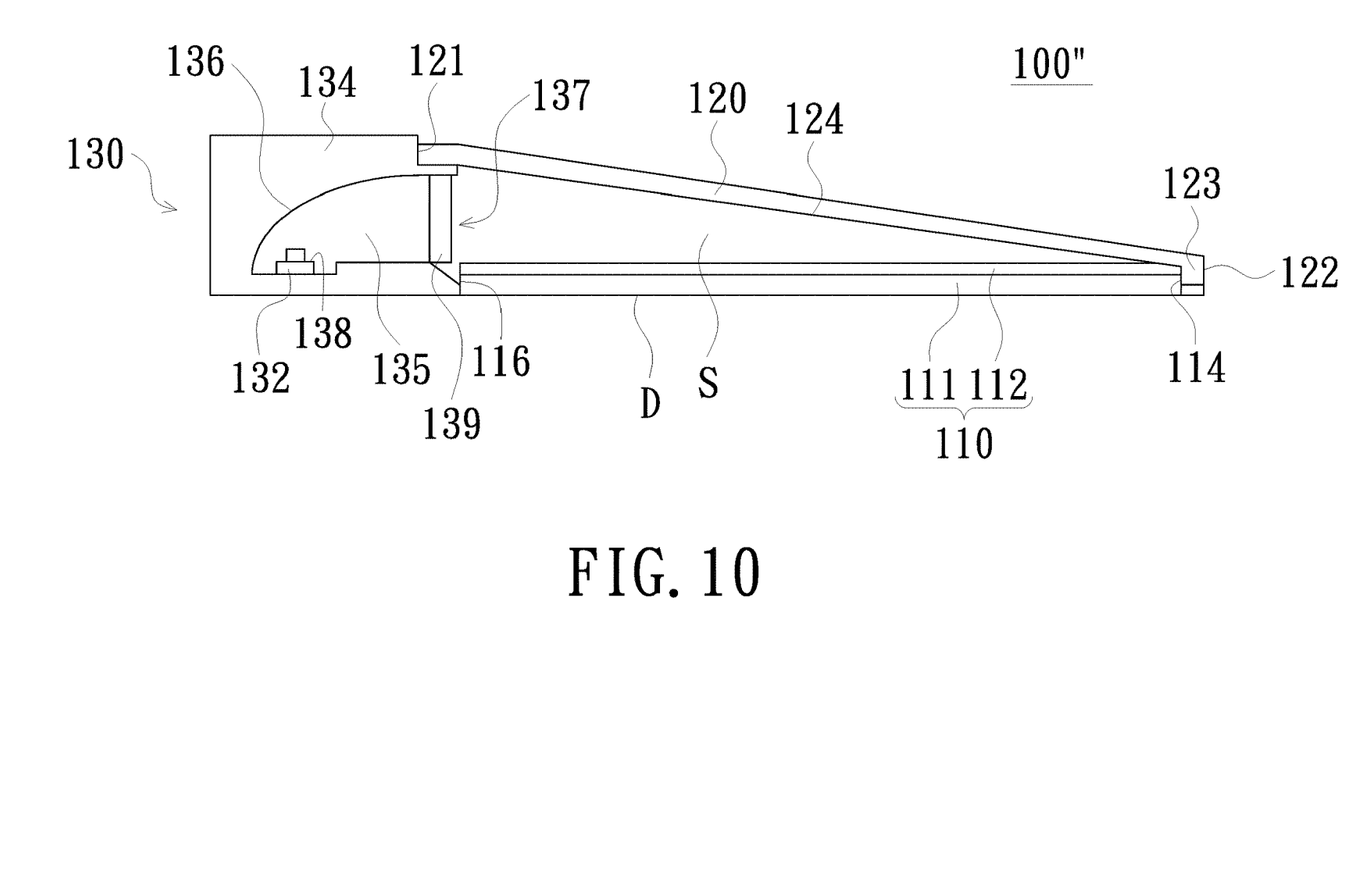
FIG. 10 is a schematic view of a transparent display device in accordance with the third embodiment of the invention.
Figure 11:
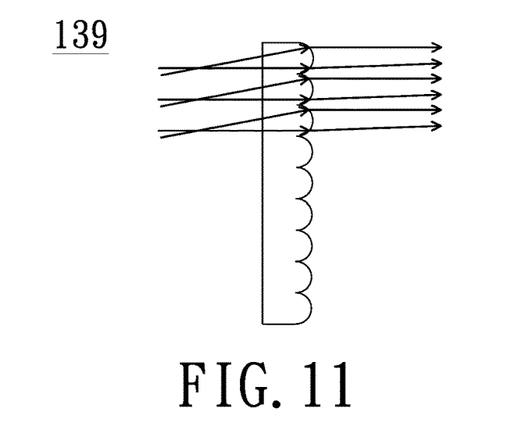
FIG. 11 is a schematic view of an optical plate of the transparent display device of the third embodiment of FIG. 10 in accordance with an embodiment of the invention.
Figure 12:
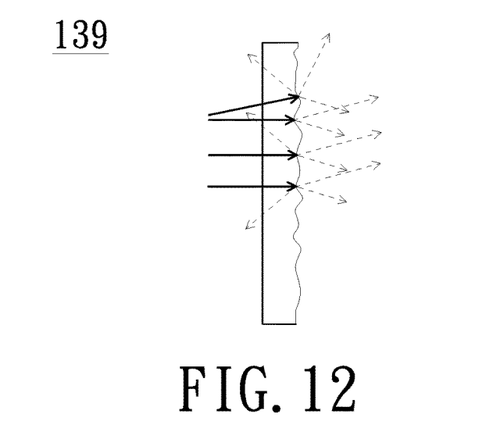
FIG. 12 is a schematic view of an optical plate of the transparent display device of the third embodiment of FIG. 10 in accordance with another embodiment of the invention.
Figure 13:
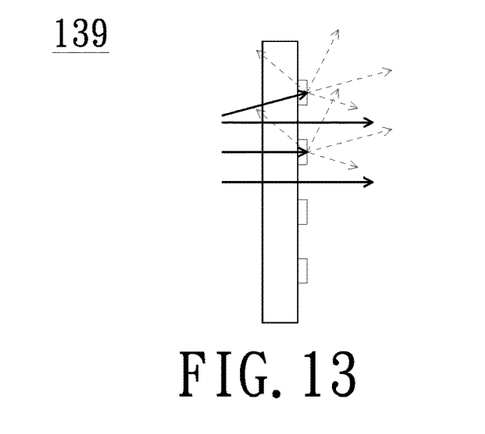
FIG. 13 is a schematic view of an optical plate of the transparent display device of the third embodiment of FIG. 10 in accordance with still another embodiment of the invention.

Please refer to FIG. 10, which is a schematic view of a transparent display device in accordance with the third embodiment of the invention. The configuration of the transparent display device 100" of the embodiment is substantially the same as that of the first embodiment shown in FIG. 1, and the same elements are given the same reference numerals and the description thereof is omitted. The embodiment differs from the first embodiment in that the light emitting assembly 130 of the embodiment further includes an optical plate 139 disposed at the opening end 137 of the lightshade 134. The optical plate 139 includes a plurality of microstructures. The microstructures may form a plurality of microlens structures, as shown in FIG. 11; the microstructures may form a rough surface to scatter light for the atomization effect, as shown in FIG. 12; or, he microstructures may form a plurality of dots on a surface to scatter light for the atomization effect, as shown in FIG. 13. After passing through the microstructures, the light emitted from the light source 132 is homogenized. It is to be noted that the microlens, the rough surface or the dots may be selectively disposed at a specific position of the optical plate 139 based on the position where the last emergent light of image requires the homogenization. That is, it is not necessary to dispose the microstructures on the entire optical plate 139. However, the entire optical plate 139 may be disposed with the microstructures based on the specific requirement. Similarly, in the embodiment, the transmissive light valve panel 110 is exemplified by a stacked structure combined with a liquid crystal display panel and a polymer dispersed liquid crystal display panel, but the invention is not limited thereto; that is, the transmissive light valve panel 110 may be, for example, a liquid crystal display panel or a polymer-dispersed liquid crystal display panel.

Figure 14:
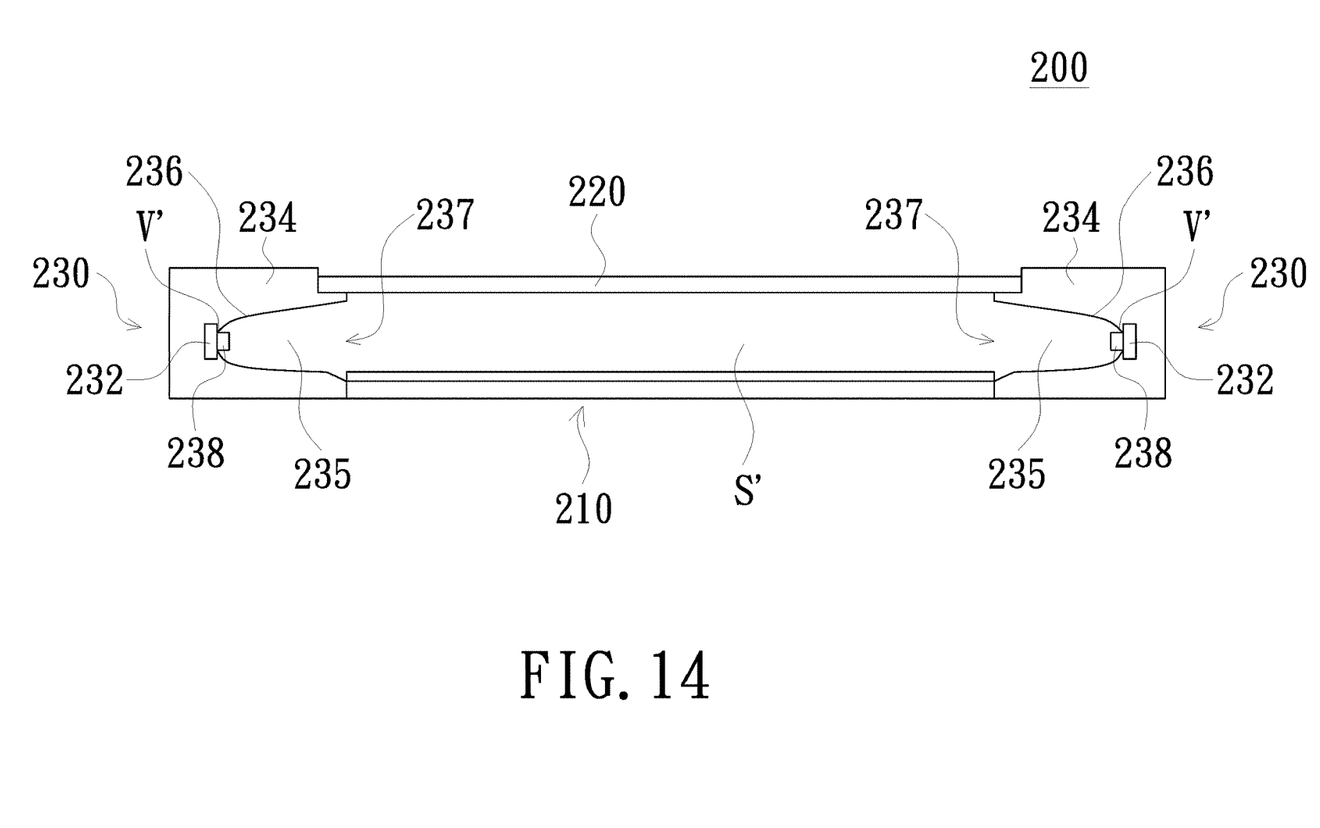
FIG. 14 is a schematic view of a transparent display device in accordance with the fourth embodiment of the invention.

Please refer to FIG. 14, which is a schematic view of a transparent display device in accordance with the fourth embodiment of the invention. The transparent display device 200 of the embodiment includes a transmissive light valve panel 210, a transparent plate 220 and two light emitting assemblies 230. The transmissive light valve panel 210 and the transparent plate 220 are disposed in parallel with each other so as to form an optical space S' between the transmissive light valve panel 210 and the transparent plate 220. The two light emitting assemblies 230 are respectively disposed on the two opposite sides of the optical space S'; that is, the two light emitting assemblies 230 are respectively connected to the two opposite ends of the transmissive light valve panel 210 and the transparent plate 220. The light emitting assembly 230 has a structure similar to that of the light emitting assembly 130 of the second embodiment shown in FIG. 8. Each of the light emitting assemblies 230 includes a light source 232 and a lampshade 234. The lampshade 234 has an accommodating space 235 and an opening end 237. The light source 232 is disposed in the accommodating space 235, and the opening end 237 faces the optical space S'. The reflective curved surface 236 of the embodiment is disposed toward the optical space S' and has an apex V'. The light source 232 is disposed at the vertex V' of the reflective curved surface 236. The light exit surface 238 of the light source 232 faces the optical space S'. The reflective curved surface 236 results the light emitted from the light source 232 to have a light pattern, and the light pattern has a maximum peak in an angular range of $\pm 15°$, respectively, as shown in FIG. 9. The light incident from the two ends of the optical space S' is transmitted in the optical space S'; and similarly, a portion of the light directly passes through the transmissive light valve panel 210 and the other portion of the light is reflected by the transparent plate 220 and then passes through the transmissive light valve panel 210 thereby generating an image. Similarly, in the embodiment, the transmissive light valve panel 210 is exemplified by a stacked structure combined with a liquid crystal display panel and a polymer dispersed liquid crystal display panel, but the invention is not limited thereto; that is, the transmissive light valve panel 210 may be, for example, a liquid crystal display panel or a polymer-dispersed liquid crystal display panel.

The invention provides the transparent display devices 100, 100', 100" and 200, in which the light emitted from the light emitting assemblies 130 and 230 enters into the optical spaces S and S', respectively, a portion of the light directly passes through the transmissive light valve panels 110 and 210, and the major portion of the light is reflected by the transparent plates 120 and 220 and then passes through the transmissive light valve panels 110 and 210 to generate an image, respectively. Because the transparent plates 120 and 220 are not disposed with microstructures such as dots, the objects behind the transparent display devices 100, 100', 100" and 200 can be clearly seen. Further, because the transparent plates 120 and 220 are not disposed with microstructures, the yield of the products is improved and the manufacturing cost is reduced. Moreover, because the transparent display devices 100, 100', 100" and 200 of the invention can corporate with a polymer dispersed liquid crystal film to atomize the light, the viewer can easily see the image desired to be displayed; and by controlling the light to pass through or to be atomized, the objects behind the transparent display devices 100, 100', 100" and 200 can be controlled to be visible or disappeared.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A transparent display device, comprising:
   a transmissive light valve panel having a display surface;
   a transparent plate disposed with respect to the transmissive light valve panel to form an optical space between the transparent plate and the transmissive light valve panel; and
   at least one light emitting assembly disposed beside the optical space, each of the light emitting assemblies comprising a light source and a lampshade, the lampshade has an accommodating space and the light source is disposed in the accommodating space, wherein the accommodating space has a reflective curved surface, and the light source is adapted to generate light into the optical space, wherein a light pattern of the light emitted from the light source and directed to the optical space has at least one maximum peak in an angular range of ±15° with respect to a direction parallel to the display surface of the transmissive light valve panel, wherein the light emitted from the light source and having the aforementioned light pattern is reflected toward the transparent plate at an incident angle larger than 80 degrees by the reflective curved surface and a light contribution of up to 65% or more is obtained, and the major portion of the light is reflected by a flat surface of the transparent plate.

2. The transparent display device according to claim 1, wherein the transparent plate has a first end and a second end opposite to each other, the transparent plate is disposed inclinedly with respect to the transmissive light valve panel, a distance between the first end of the transparent plate and the transmissive light valve panel is greater than a distance between the second end of the transparent plate and the transmissive light valve panel, and the at least one light emitting assembly is located at the first end of the transparent plate.

3. The transparent display device according to claim 2, wherein the transparent plate is inclined at an angle of less than 15 degrees with respect to the transmissive light valve panel.

4. The transparent display device according to claim 2, wherein the second end of the transparent plate is connected to the transmissive light valve panel.

5. The transparent display device according to claim 1, wherein the transparent plate is disposed parallel to the transmissive light valve panel.

6. The transparent display device according to claim 5, wherein a number/quantity of the at least one light emitting assembly is two, and the two light emitting assemblies are disposed at two opposite sides of a periphery of the optical space.

7. The transparent display device according to claim 1, wherein the lampshade further has an opening end and the opening end faces the optical space.

8. The transparent display device according to claim 1, wherein the lampshade directs at least 50% of the light emitted from the light source in an angular range of ±15° with respect to the direction parallel to the display surface of the transmissive light valve panel.

9. The transparent display device according to claim 7, wherein the opening end of the lampshade is connected to the transmissive light valve panel and the transparent plate.

10. The transparent display device according to claim 1, wherein the light source has a light exit surface, and the light exit surface faces the reflective curved surface, and the reflective curved surface extends from a side of the light source in a direction toward the optical space.

11. The transparent display device according to claim 10, wherein the light exit surface of the light source is parallel to the display surface.

12. The transparent display device according to claim 7, wherein the light source has a light exit surface, the light exit surface faces the optical space, the reflective curved surface faces the optical space, and the light source is disposed at an apex of the reflective curved surface.

13. The transparent display device according to claim 7, wherein the light emitting assembly further comprises an optical plate disposed at the opening end of the lampshade, and the optical plate comprises a plurality of microstructures.

14. The transparent display device according to claim 1, wherein the transmissive light valve panel is a polymer dispersed liquid crystal (PDLC) panel.

15. The transparent display device according to claim 1, wherein the transmissive light valve panel is a liquid crystal display panel.

16. The transparent display device according to claim 1, wherein the transmissive light valve panel comprises a liquid crystal display panel and a polymer-dispersed liquid crystal panel.

17. The transparent display device according to claim 1, wherein the transparent plate has a surface in a smooth shape and facing the transmissive light valve panel.

* * * * *